Aug. 24, 1965 R. A. WOLFF 3,202,967

REMOTE CONTROL SYSTEM

Filed May 7, 1962

INVENTOR.
Robert A. Wolff
BY
James T. Barr
ATTY.

3,202,967
REMOTE CONTROL SYSTEM
Robert A. Wolff, La Grange Park, Ill., assignor to Admiral Corporation, Chicago, Ill., a corporation of Delaware
Filed May 7, 1962, Ser. No. 192,871
8 Claims. (Cl. 340—171)

This invention relates in general to control circuits and in particular to control circuits for selectively energizing one of a plurality of utilization means in response to receipt of a corresponding one of a like plurality of control signals.

More particularly, this invention relates to remote control systems using frequency control signals in the ultrasonic range, in which a high degree of immunization from unwanted signals is realized. Remote control systems of this type have been previously disclosed in U.S. Patent 3,027,497, issued March 27, 1962, to R. C. Carlson et al. and in U.S. Patent 2,996,681, issued August 15, 1961, to M. Marks, both of which are assigned to the same assignee herein. The present invention is an improvement in these prior systems.

One of the most important attributes of any remote control system is that it respond to desired signals and not to noise. Therefore, a method is required to differentiate between a single desired frequency signal and a noise signal of many frequencies, usually including the desired frequency. Several factors must be taken into consideration in designing remote control systems using ultrasonic control signals. In order to provide the most economic system, the signal to noise ratio of the unit preceding the discriminator circuitry and the signal power input desired to actuate the utilization means must be carefully determined. An obvious expedient to eliminate noise is, of course, to design the receiving means such that a control signal far greater than the anticipated noise level is required to actuate the receiving means. In numerous applications, for example, remote control systems for controlling the operation of television receivers, where the transmitting means is wholly mechanical and held by the operator, this approach is not practical. When the signal power input available is limited, as in these cases, the receiving means must be responsive to low level signals, and these low level signals must be, in turn, amplified in order to provide sufficient power to actuate the utilization means. The receiving means in these latter cases will be responsive to low level noise signals also, and the signal to noise ratio becomes a limiting factor. This problem is intensified in remote control systems using mechanically generated ultrasonic control signals, since as experience has shown, the generation and propagation characteristics of signal frequencies dictate that they be not widely separated, as would be desirable.

The remote control system disclosed in the above-mentioned patent to R. C. Carlson et al. employs an electromechanical discriminator having spaced apart fulcrums which provides a so-called mechanical disadvantage to signals attempting to actuate it. These fulcrums are spaced apart a distance which is dependent upon the signal to noise ratio of the electronic circuitry preceding the electromechanical discriminator, and the signal power input desired to actuate the utilization means. According to the teaching of the patent a remote control system can be optimally designed.

While the electromechanical discriminator disclosed in the above-mentioned patent to Carlson et al. exceptionally good noise immunity it does not have the advantages inherent in all electronic arrangement, for example, no mechanical parts or moving operations. It is therefore the principal object of this invention to provide an improved electronic discriminator which is functionally equivalent to the above-mentioned electromechanical discriminator, without necessitating the use of mechanical parts.

It is a further object of this invention to provide an improved all electronic remote control system whose immunity to noise is dependent upon the signal to noise ratio of the electronic circuitry preceding it, and the signal power input desired to actuate the utilization means.

It is a still further object of this invention to provide an all electronic discriminator for selectively energizing one of a group of utilization means in response to a corresponding one of a like group of control signals.

It is a still further object of this invention to provide an all electronic discriminator wherein the energization of one control channel automatically inhibits the energization of another control channel.

It is a further object of this invention to provide an all electronic discriminator of the type described wherein simultaneously received signals must bear at least a predetermined amplitude ratio to produce any effective output.

It is a further object of this invention to provide an all electronic discriminator of the type described above wherein the immunity to noise of each control channel may be individually adjusted to a particular level.

Other objects of this invention not specifically mentioned will be readily apparent from a reading of the following specification taken in conjunction with the following drawing in which.

Figure 1:
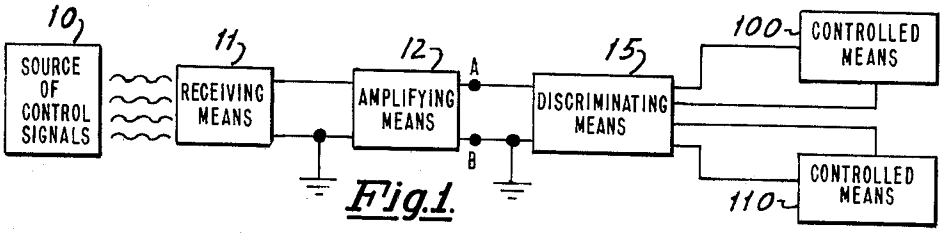
FIG. 1 is a block diagram of an ultransonic remote control system in which the invention readily finds application.

While the environment chosen for description of this invention is a remote control system using ultrasonic control signals, it will be readily appreciated that the principles and structure of the invention may be employed in many other arrangements utilizing various other type wave energy signals.

It will be understood at the outset that, while transistors are shown in the drawings, conventional vacuum tubes may be substituted therefor (with obvious changes in operating potentials and polarities) on the basis that the emitter corresponds to the cathode, the base corresponds to the control grid and the collector corresponds to the plate. It will also be noted that while transistors of the PNP type are shown, transistors of the NPN type may also readily be used in this arrangement by the simple expedient of reversing the voltage polarities. Throughout this specification like reference characters are used to indicate like parts.

In FIG. 1 there is shown a source of control signals 10 which is arranged to transmit one or more control signals of different frequencies to a receiving means 11. The output of receiving means 11 is coupled to the input of amplifying means 12, the output of which is coupled to discriminating means 15. Discriminating means 15 may have a plurality of signal translation or control channels and a corresponding plurality of outputs, though only two are shown in FIG. 1. These outputs are shown individually connected to controlled means 100 and 110, respectively. As shown, the circuitry of FIG. 1 is designed to actuate controlled means 100 in the presence of a control signal of one frequency and controlled means 110 in the presence of a control signal of another frequency. In practice, controlled means 100, for example, might contain circuitry for automatically changing the station tuning of a television receiver and controlled means 110, circuitry for varying the volume level of the receiver.

Source of control signals 10 comprises, in one well known prior art television control system, an actuator or transmitter containing a number of tuned ultrasonic rods and means for individually striking them. The actuator is generally small enough to be held in the hand of the operator and the keys or buttons corresponding to the individual rods are labelled according to function such as "station selection," "volume," "on-off," etc. Of course a separate control channel is required for each control button.

In operation, the operator depresses the button corresponding to the control function desired. An ultrasonic wave of a particular frequency is then propagated through the air and is received by a suitable receiving unit in receiving means 11. The ultrasonic signal is converted into an electrical signal of like frequency and is then amplified in amplifying means 12. The amplified signal is then coupled to terminals A and B of discriminating means 15. Discriminating means 15, which will be described more fully hereinafter, contains circuitry for segregating the received control signal on the basis of its frequency, for energizing the appropriate signal translation channel, and for insuring that, responsive to receipt of this frequency the correct one of controlled means 100 and 110 is energized. It will be understood that source of control signals 10, receiving means 11, and amplifying means 12 may take any of the various forms well known in the art.

Figure 2:
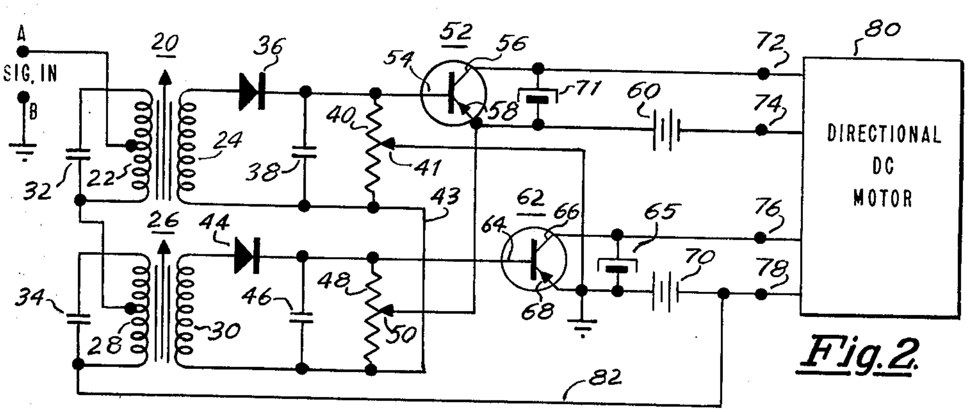
FIG. 2 represents a partial schematic diagram of the portion of the block diagram of FIG. 1 embodying the invention.

Referring now to FIG. 2 which is a schematic diagram of that portion of FIG. 1 to the right of amplifying means 12, the amplified signals from amplifying means 12 are coupled to terminals A and B, labelled SIG. IN, of discriminating means 15 and flow through the tuned circuits 20 and 26. The tuned circuit 20 comprises transformer primary winding 22 and tuning capacitor 32, and is tuned to the frequency of one of the ultrasonic control signals. Tuned circuit 26 comprises transformer primary winding 28 and tuning capacitor 34, and is tuned to the frequency of the other ultrasonic control signal. The source of power 70 connected to one terminal of primary winding 28 and ground supplies an operating potential through these tuned circuits to the amplifying stages (not shown) in amplifying means 12.

An electrical signal, responsive to receipt of a control signal having a frequency to which tuned circuit 20 is tuned, is induced in secondary winding 24 and is rectified and filtered by diode 36 and filter capacitor 38. The upper plate of capacitor 38 is charged positive due to the action of diode 36 and current flows through secondary winding 24, diode 36 and potentiometer 40. An electrical signal, responsive to receipt of a control signal having a frequency to which tuned circuit 26 is tuned, is induced in secondary winding 30 and is rectified and filtered by diode 44 and filter capacitor 46, in the same fashion. The upper plate of capacitor 46 is charged positive and current flows through secondary winding 30, diode 44, and potentiometer 48. This current flow establishes potentials across potentiometers 40 and 48 which are coupled to a pair of electron valves 52 and 62 which may be, for example, conventional vacuum tubes, transistors, or diodes, for forward biasing one of the electron valves and for back biasing the other one of the pair. This operation will be explained in greater detail in the description which follows.

Before proceeding further with this description, one aspect of this invention may be conveniently noted at this point. It will be recalled by those skilled in the art that generally large electrolytic capacitors are included at some point in the coupling between various stages of control circuits of this low impedance type to allow only control signals having a predetermined amplitude and duration to effect operation of the control system. The electrolytic capacitors 71 and 65 are shown and perform this function. However, in accordance with this invention capacitors 71 and 65 may be eliminated and the capacitance of capacitor 38 selected so that capacitor 38 in conjunction with the resistance of secondary winding 24 and diode 36 forms an integration network which operates in the same fashion. Capacitor 46 may be selected such that in conjunction with the resistance of secondary winding 30 and diode 44 performs a similar function. These latter components therefore actually perform a dual function since they also serve to rectify and filter the control signals.

A bi-directional D.C. motor 80 is shown (in block form) connected to the output terminals 72, 74, 76, and 78. Motor 80 is preferably of the type disclosed in the copending application of R. A. Wolff et al., filed April 25, 1961, Serial No. 105,492, assigned to the same assignee as the present invention. It is to be understood, however, that while this motor is disclosed as a preferred motor any D.C. motor of similar construction and operation may be used. In the above-mentioned copending application the motor is shown comprising a single center-tapped field winding. For the purpose of this invention two separate field windings are to be used and thus the disclosed motor is easily adapted to the present invention. These two separate field windings (not shown) are connected, respectively, to the output terminals 72 and 74 and output terminals 76 and 78, and in this disclosed embodiment they constitute the controlled means 100 and 110, respectively. For a complete description of the motor and its operation reference is made to the above-mentioned copending application. It is only necessary for the purpose of this disclosure to understand that current flow through the two field windings causes D.C. motor 80 to rotate in a clockwise and counterclockwise direction, respectively.

Transistors 52 and 62 comprise the above-mentioned pair of electron valves, in FIG. 2, and these transistors control the operation of the D.C. motor 80. These transistors are of the PNP type which require the base electrode to be slightly negative with respect to the emitter electrode for conduction to occur along the base-emitter path. As is well known in the art, a small base-emitter current gives rise to a large emitter-collector current and this phenomenon may be utilized for amplification.

In accordance with this invention, the base-emitter input circuits of transistors 52 and 62 are connected to potentiometers 40 and 48 in a manner such that when control signals are applied to tuned circuit 20, transistor 52 is back biased and transistor 62 is forward biased, and when control signals are applied to tuned circuit 26, transistor 52 is forward biased and transistor 62 is back biased. This is as follows. Base 54 of transistor 52 is connected to the upper terminal (as shown) of potentiometer 40 and its emitter 58 is connected to its lower terminal via movable tap 50 of potentiometer 48. The full bias potential established across potentiometer 40 is therefore coupled to the base-emitter input circuit of transistor 52 and it is effectively back biased, since the upper terminal of potentiometer 40 is positive with respect to its lower terminal. Transistor 62 on the other hand has its emitter 68 connected to tap 41 of potentiometer 40 and its base 64 connected to the lower terminal of potentiometer 40 via potentiometer 48 and conductor 43. Tap 41 is also positive with respect to the lower terminal of potentiometer 40 and transistor 62 is therefore forward biased for conduction. It may be noted that with respect to potentiometer 48 the bias potential established across it is coupled to the base-emitter input circuits of transistors 52 and 62 in just the opposite fashion. That is, the full bias potential established across potentiometer 48 is coupled to the base-emitter input circuit of transistor 62 to back bias it while a fraction of the bias potential across potentiometer 48 is coupled to the base-emitter input circuit of transistor 52 to forward bias it.

Collector 56 of transistor 52 is connected to output terminal 72 while its emitter 58 is connected to output terminal 74 through the source of potential 60. Collector 66 of transistor 62 is connected to output terminal 76 while its emitter 68 is connected to output terminal 78 through source of potential 70. When the base-emitter input circuit of transistor 52 is forward biased for conduction current will flow in its collector-emitter output circuit, through the field winding (not shown) of D.C. motor 80 causing D.C. motor 80 to rotate in a selected direction. Current flow in the collector-emitter output circuit of transistor 62 flows through the other field winding of D.C. motor 80 and causes it to rotate in the opposite direction. Capacitors 71 and 65 included in the coupling between transistors 52 and 62 and the field windings connected, respectively, thereto, assure that only signals having a predetermined minimum amplitude and duration are effective to render D.C. motor 80 operative, as previously described.

It may be recalled that only a fraction of the bias potential established across potentiometer 40 is coupled to the base-emitter input circuit of transistor 62 to forward bias it for conduction while the full bias potential established across potentiometer 40 is coupled to the base-emitter input circuit of transistor 52 to back bias it. Assume for the purpose of explaining the operation that this condition has occurred, that is, that a bias potential has been established across potentiometer 40, transistor 52 is back biased and transistor 62 is forward biased for conduction. In order to simplify the explanation, also assume that the resistance on each side of the taps 41 and 50 of potentiometers 40 and 48 is equal. Under these conditions if a signal is coupled to tuned circuit 26, a bias potential is established across potentiometer 48, in the manner previously described. The full bias potential established across potentiometer 48 is coupled to the base-emitter input circuit of transistor 62 to back bias transistor 62 whereas only half the bias potential established across potentiometer 40 is coupled thereto to forward bias it. Under these conditions, therefore, a potential with only half the value of the potential established across potentiometer 40 is effective to cancel the forward bias on transistor 62. The operation is of course the same if transistor 52 is conductive and a signal is coupled to tuned circuit 20.

The advantage of such an arrangement will be apparent from the material which follows. In the event two signals are received at input terminals A and B, and assuming that one signal corresponds to the frequency of tuned circuit 20 and the other to that of tuned circuit 26, a potential will be established across both potentiometers 40 and 48, in the manner described. Both transistor 52 and transistor 62 will be back biased and will be ineffective to render D.C. motor 80 operative. While this assumed condition is rarely likely to occur it often happens that a control signal is accompanied by noise signals having components at the frequency corresponding to that of the other tuned circuit. If the control signal is strong enough it may override the noise signals but, due to the inhibition feature, more often neither signal will effect operation of the controlled means. This situation is desirable from the standpoint of noise immunity since it is much more preferable to have both control channels inhibited in the presence of strong noise signals than to have faulty operation.

The problem of noise immunity is extremely important to prevent spurious operation of the control system. As noise pulses or signals generally comprise many frequencies it is nearly certain that in the presence thereof both tuned circuits and hence both control channels will be energized to some extend. Since both tuned circuits are energized the bias potentials developed across potentiometers 40 and 48 tends to back bias each of the transistors, thus impeding their operation. Hence random noise will require a great concentration at one particular frequency to cause malfunctioning of the control system. Assume that this last mentioned condition does exist, that is, that there is a great concentration of noise at one particular frequency. It may be noted that a further advantage of this invention is that potentiometers 40 and 48 may be varied individually to vary the amplitude of the bias potential coupled to the base-emitter input circuits of transistors 52 and 62, respectively, to effectively vary the immunity of each of the channels to noise individually in accordance with the signal to noise ratio of that portion of the control system preceding transistors 52 and 62. For example, if this concentration of one particular frequency corresponds to the frequency to which tuned circuit 20 is tuned, tap 41 of potentiometer 40 may be adjusted to compensate for this. Furthermore, the system's overall immunity to noise may be compensated for by varying the position of taps 41 and 50 of potentiometers 40 and 48, respectively, in accordance with the signal to noise ratio of the control system, and the signal power input desired to actuate the controlled means.

Figure 3:
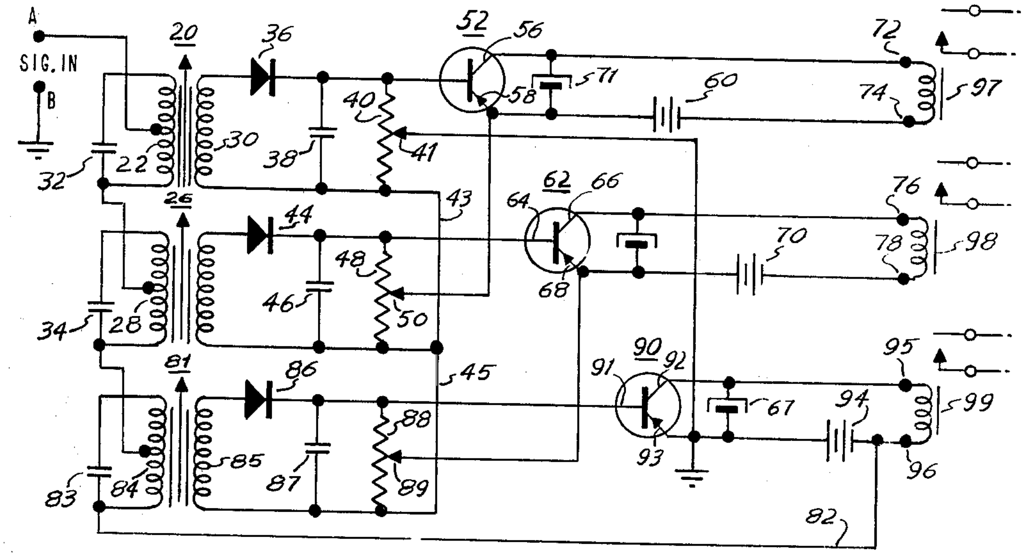
FIG. 3 represents the circuitry of FIG. 2 modified to provide for a greater number of control functions.

Referring not to FIG. 3, the basic discriminator circuit 15 is shown expanded to provide three control channels for controlling three controlled means 97, 98 and 99. Each of the components in FIG. 3 which correspond to like components in FIG. 2 are indicated with the same reference characters. With this arrangement, control signals coupled to terminals A and B flow through each of the tuned circuits 20, 26, and 81, and each of these tuned circuits are tuned to the frequency of a different control signal. A control signal having a frequency to which tuned circuit 81 is tuned, for example, is coupled to secondary winding 85 and is rectified and filtered by means of diode 86 and filter capacitor 87. Capacitor 87 is charged with a positive potential on its upper plate due to the action of diode 86 and current flow through potentiometer 88 established a potential across it, all in the manner previously described. Control signals having frequencies to which tuned circuits 20 and 26 are tuned establish potentials across potentiometers 40 and 48, respectively, in a like manner.

The base-emitter input circuits of transistors 52, 62 and 90 are connected in the same manner as are the base-emitter input circuits of the transistors shown in FIG. 2. Base 54 of transistor 52 is connected to the upper terminal (as shown) of potentiometer 40 while its emitter 58 is connected to the lower terminal via tap 50 of potentiometer 48. Base 64 of transistor 62 is connected to the upper terminal (as shown) of potentiometer 48 while its emitter 68 is connected to the lower terminal via tap 89 of potentiometer 88. Base 91 of transistor 90 is connected to the upper terminal (as shown) of potentiometer 88 while its emitter 93 is connected to the lower terminal via tap 41 of potentiometer 40.

Assume for the purpose of explaining the operation of this arrangement that a control signal to which tuned circuit 20 is tuned is applied thereto and that current flow has established a potential across potentiometer 40, in the manner previously described. Transistor 52 is back biased since its base 54 is connected to the positive upper terminal of potentiometer 40 and its emitter 58 is connected to the lower negative terminal via tap 50 of potentiometer 48. Transistor 90 on the other hand is forward biased since tap 41 is positive with respect to the lower terminal of potentiometer 40 and emitter 93 of transistor 90 is connected to tap 41 while its base 91 is connected to the lower terminal via potentiometer 88. In this arrangement, transistor 62 is also forward biased but, as will be explained, there is not sufficient current flow through transistor 62 to render controlled means 98 connected thereto operative.

It may be noted that base 64 of transistor 62 is connected to the lower terminal of potentiometer 40 through potentiometer 48 and that emitter 68 of transistor 62 is connected to tap 89 of potentiometer 88. When transistor 90 is conductive, current flows as follows: through potentiometer 40 and its tap 41, emitter 93 and base 91 of transistor 90, potentiometer 88, and back to potentiometer 40. Since tap 89 of potentiometer 88 is positive with respect to its lower terminal (which is common to the lower terminals of potentiometers 40 and 48) due to the current flowing through it, transistor 62 is forward biased and current flows in its base-emitter path. This current is relatively small compared to the current flow in the main path, that is, through transistor 90. For example, if the resistance on each side of the taps 41, 50 and 89 are equal, approximately one-third of the current flow in the main path flows through transistor 62.

Similary, if a control signal having a frequency to which tuned circuit 26 is tuned is applied thereto, transistor 62 is back biased and transistor 52 is forward biased. Transistor 90 is also forward biased due to the current flow through potentiometer 40 and, as in the case of transistor 62 above described, the current flow is not sufficient to render the controlled means 99 connected thereto operative.

Likewise, if a control signal having a frequency to which tuned circuit 81 is tuned is applied thereto, transistor 90 is back biased and transistor 62 forward biased, and transistor 52 is forward biased as in the case of transistors 62 and 90 described above. The detailed operation in these latter cases is not described since the operation is the same as described for the case when control signals are applied to tuned circuit 20.

It may be noted that, as in the case of the arrangement shown in FIG. 2, noise signals having frequencies to which any of the channels are tuned will, in effect, back bias the transistors associated with each of the other adjacent channels. Also, the immunity of each of the channels may be individually adjusted to compensate for local concentration of noise at any particular frequency and that the over-all immunity of the discriminator circuitry may be adjusted in accordance with the signal to noise ratio of the control system.

The collector-emitter output circuits of transistors 52, 62, and 90 are connected to the output terminals 72 and 74, 76 and 78, and 95 and 96, respectively. Also connected to these output terminals are controlled means 97–99, which in this embodiment are shown to be relays. When transistors 52, 62, and 90 are rendered conductive, current flows in their respective output circuits, through the relay coils, causing the relays to operate their associated contacts. These relays are chosen to require energizing currents such that sufficient current flow occurs, in general, only when the transistors with which they are individually associated constitute the main path of current flow described above, the current flow through the other path described above being generally insufficient to render them operative.

Any two of the relays 97–99 may also be replaced by bidirectional D.C. motor 80 by connecting the field windings (not shown) thereof to the appropriate output terminals 72 and 74, 76 and 78, and 95 and 96. The D.C. motor disclosed in the above-mentioned Wolff et al. application is preferred for this application also, since it will operate only when there is sufficient current flow through its field windings to move the armature axially to align itself, as described in the Wolff et al. application. The current flow through the main path, as in the case above described, is sufficient to operate D.C. motor 80, whereas the current flow through the other path is not sufficient.

Figure 4:
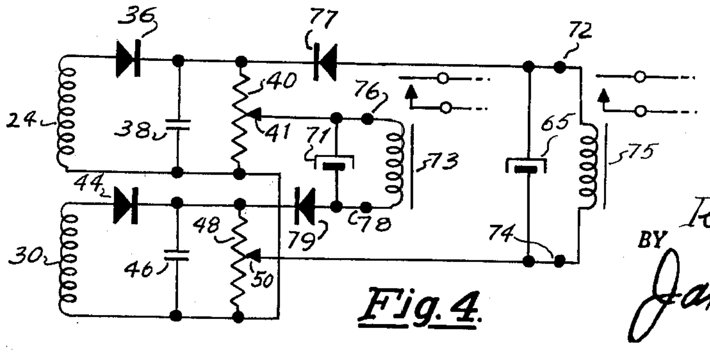
FIG. 4 represents a modification of a portion of FIG. 2.

In FIG. 4 there is shown a modification of the circuitry shown in FIG. 2 in that diodes are substituted for transistors 52 and 62. It may be noted that diodes may also be substituted for the transistors shown in FIG. 3. Also, relays 73 and 75 connected to the output terminals 72 and 74 and output terminals 76 and 78, respectively, are shown in place of the filed windings (not shown) of bidirectional D.C. motor 80 although D.C. motor 80 could just as well be used. Only secondary windings 24 and 30 are shown for the purpose of simplifying the drawing.

The principle of operation of this arrangement is the same as that of the arrangement of FIG. 2. A signal coupled to secondary winding 24 is rectified and filtered by means of diode 36 and capacitor 38: The upper plate of capacitor 38 (as shown) is charged positive due to the action of diode 36, and current flow through secondary winding 24, diode 36 and potentiometer 40 establishes a potential across potentiometer 40, as previously described. A potential is established across potentiometer 48 when a control signal is coupled to secondary winding 30 in a like manner. Diode 77 has its cathode connected to the upper terminal of potentiometer 40 (as shown) and its anode connected to output terminal 72. Relay 75 has one terminal of its coil connected to output terminal 74. Output tap 50 of potentiometer 48 is connected to output terminal 74. Diode 79 is connected in a like manner, that is, the cathode of diode 79 is connected to the upper terminal (as shown) of potentiometer 48 and its anode is connected to output terminal 78. Output tap 41 of potentiometer 40 is connected to output terminal 76. Relay 73 has the two terminals of its coils connected to the output terminals 76 and 78, respectively.

In this case, as previously described, potentials are established across each of the potentiometers 40 and 48. These potentials are coupled to diodes 77 and 79 and are effective to forward bias the diode associated with one channel and to back bias the diode associated with the adjacent channel. Assume, for example, that a signal to which tuned circuit 20 is tuned is coupled thereto and that a potential is established across potentiometer 40. Diode 77 with its cathode connected to the upper terminal of potentiometer 40 and its anode coupled through relay 75 to the lower terminal of potentiometer 40 will be back biased since the upper terminal is positive with respect to the lower terminal. Diode 79, however, has its anode coupled to tap 41 of potentiometer 40 through relay 73 and its anode coupled to the lower terminal of potentiometer 40 through potentiometer 48, and hence is forward biased since tap 41 is positive with respect to the lower terminal. Current will flow through the coil of relay 73 causing it to operate to close its contacts. A control signal coupled to the adjacent channel forward biases diode 77 and back biases diode 79 in a like manner, and hence relay 75 is energized and closes its contacts.

All of the advantages derived from the arrangements shown in FIGS. 2 and 3 are also present in this arrangement, that is, to restate just a few of them, the ability to adjust the overall immunity to noise dependent upon the signal to noise ratio of the control system, the ability to individually adjust the immunity to noise of each channel.

While the invention has been particularly described in conjunction with a remote control system employing ultrasonic control signals it should not be construed as being limited thereto. Since numerous modifications and departures from the invention may be made within the true scope thereof, the invention is to be limited only to the appended claims.

What is claimed is:

1. A control system having a common signal translation channel and a pair of individual signal translation channels selectively energizable responsive to receipt of a corresponding pair of control signals; a discriminator in said system comprising a pair of electron valves each having an input circuit coupled to said common signal translation channel and an output circuit coupled to a corresponding one of said individual signal translation channels; an impedance array, for applying bias potentials to said electron valves, coupled across said input circuits such that potential appearing across any of said input circuits biases its corresponding electron valve in a conductive direction and biases said other electron valve in a non-conductive direction; said impedance array being arranged such that all or only a portion of an impedance value may be used in applying bias potential to said electron valves, whereby the bias potentials are proportioned such that simultaneously appearing potentials at said input circuits must bear at least a ratio of magnitude substantially larger than unity before conduction occurs in either of said electron valves.

2. A control system including a common signal translation channel and a pair of individual signal translation channels having output terminals selectively energizable responsive to receipt of a corresponding pair of control signals, said system being subject to spurious noise; a discriminator in said system comprising a pair of electron valves each having an input circuit coupled to said common translation channel and an output circuit coupled to a corresponding one of said individual translation channels and means in each said input circuit responsive to a different one of said pair of control signals; a resistance network coupled across said input circuits and applying bias potentials to said electron valves such that potentials occurring across any of said input circuits, responsive to said control signals, biases a corresponding one of said electron valves in a conductive direction and biases the other electron valve in a non-conductive direction; said resistance network being arranged such that all or only a portion of a resistance value may be used in applying bias potential to said electron valves, the bias potentials thereby being proportioned such that simultaneously appearing potentials at said input circuits must bear a ratio of magnitude substantially greater than unity to cause energization of either of said output terminals, said last-mentioned ratio being determined by the signal-to-noise ratio of the circuitry preceding said electron valves and the minimum control signal power desired to energize said output terminals, whereby said spurious noise is effectively discriminated against.

3. A control system as set forth in claim 2 wherein said electron valves are transistors having partially cross-connected input circuits.

4. A control system as set forth in claim 3 wherein said control signals are of different frequency and said input circuits are tuned to respective ones of said frequencies.

5. A control system as set forth in claim 4 wherein said input circuits further include rectifying junctions for developing unidirectional potentials across said resistance network.

6. A remote control system for selectively energizing a pair of utilization devices responsive to receipt of one of a pair of control signals of different frequencies lying within a fixed frequency band, said system being susceptible to spurious noise signals lying within said frequency band, comprising: receiving means for receiving and amplifying signals within said frequency band; frequency discriminating circuit means coupled to said receiving means for segregating said control signals on the basis of frequency, said frequency discriminating circuit means having a first and a second input circuit each including tuned circuit means coupled to said receiving means and tuned to frequencies corresponding to the frequencies of said control signals, respectively, and first and second output circuits; and a resistance network coupled across said input circuits; a first and a second transistor included in said frequency discriminator means, said transistors, upon being driven conductive responsive to receipt of respective ones of said control signals, energizing said output circuits; said resistance network having potentials impressed thereon responsive to energization of said tuned circuit means and applying bias potentials to said transistors for forward biasing said first transistor and back biasing said second transistor responsive to receipt of said first control signal and for forward biasing said second transistor and back biasing said first transistor responsive to receipt of said second control signal, said resistance network being arranged such that differing portions of a resistance value may be used in applying bias potential to said transistors, whereby the bias potentials are proportioned such that simultaneously appearing potentials in said input circuits must bear a ratio of magnitude substantially greater than unity to cause energization of said output circuits, said ratio of magnitude being determined by the signal-to-noise ratio of the circuitry preceding said transistors and the minimum control signal power desired to energize said output circuits.

7. A control system including a pair of individual signal translation channels having outputs selectively energizable responsive to receipt of a corresponding pair of control signals of different frequencies; said system being subject to spurious noise including the frequencies of said control signals; a discriminator in said system comprising a pair of electron valves each having a tuned input circuit tuned to the frequency of a different one of said control signals and an output circuit coupled to a corresponding one of said individual signal translation channels; means impressing received control signals on both said input circuits; a resistance network, for applying bias potentials to said electron valves, comprising a plurality of potentiometers coupled across said tuned input circuits such that potentials appearing across any of said input circuits bias the corresponding one of said electron valves in a conductive direction and bias the other electron valve in a non-conductive direction; said potentiometers being arranged to use different portions of a resistance value in applying bias potential to said valves, said bias potentials thereby being proportioned such that simultaneously appearing potentials at said tuned input circuits resulting from simultaneously received control signals, noise or combinations thereof, must bear a ratio of magnitude substantially greater than unity to cause conduction in said electron valves, said ratio of magnitude being determined by the signal-to-noise ratio of the circuitry preceding said electron valves and the minimum control signal power desired to energize said outputs, said ratio of magnitude being further variable for each channel by adjustment of said potentiometers whereby said spurious noise and a selected control signal may be effectively discriminated against.

8. A control system having a common signal translation channel and a plurality of individual signal translation channels selectively energizable responsive to receipt of a corresponding plurality of control signals; a discriminator in said system comprising a plurality of electron valves each having an input coupled to said common signal translation channel and an output coupled to a corresponding one of said individual signal translation channels; an impedance array for applying bias potentials to said electron valves, said impedance array being coupled across said input circuits such that a potential appearing across any of said input circuits biases its corresponding electron valve in a conductive direction and biases at least one other electron valve in a non-conductive direction; said impedance array being arranged such that differing portions of an impedance value may be used in applying bias potential to said electron valves, whereby said bias potentials are proportioned such that a simultaneously appearing potential at the input corresponding to said one other electron valve must bear at least a ratio of magnitude with respect to said first-mentioned potential which is substantially greater than unity before conduction occurs in either of said electron valves.

References Cited by the Examiner

UNITED STATES PATENTS 2,954,436 9/60 Maniere et al. ---------- 317—138

SAMUEL BERNSTEIN, *Primary Examiner.*